Aug. 1, 1961  H. B. ARNOLD  2,994,455
METALLIC CONTAINERS
Filed Aug. 5, 1959
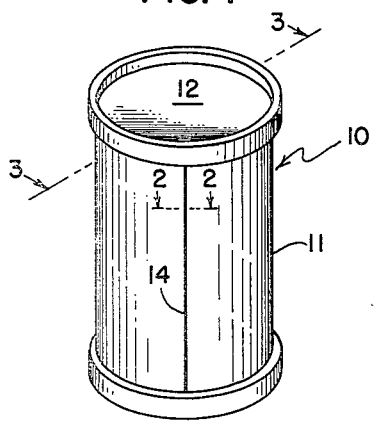
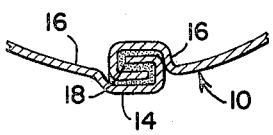
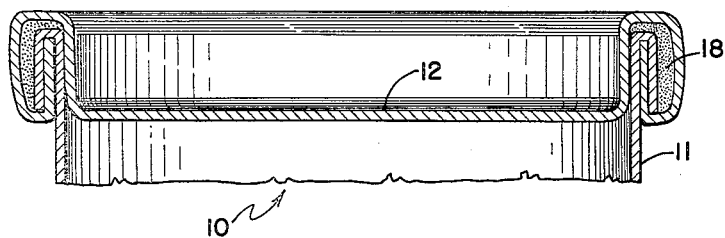
*INVENTOR.*
HEINZ B. ARNOLD
BY *Patrick J. Span*
ATTORNEY : 2,994,455
Patented Aug. 1, 1961

2,994,455
METALLIC CONTAINERS
Heinz B. Arnold, Minneapolis, Minn., assignor to General Mills, Inc., a corporation of Delaware
Filed Aug. 5, 1959, Ser. No. 831,865
4 Claims. (Cl. 220—81)

This invention relates to metallic containers and in particular to metallic containers having seams bonded with an adhesive or cement composed of the reaction product of amino imidazolines and epoxy resins.

In the past, metallic containers have had their seams bonded with metallic solder. Various resins have been proposed for cementing the seams of such containers as a substitute for the solder. However, in general, such resins have not been successful in becoming a substitute for the metallic solder. One deficiency common to many of the resins proposed is poor adhesion to many of the metal surfaces. It has now been found that containers having their seams bonded with an adhesive which is the reaction product of amino imidazolines and epoxy resins are as good as or superior to metallic cans or containers having their seams bonded with metallic solder.

It is therefore an object of this invention to provide a container having seams bonded with an adhesive which is the reaction product of amino imidazolines and epoxy resins.

In the drawing:
FIGURE 1 is a perspective view of a metallic container.
FIGURE 2 is a partial sectional view taken along line 2—2 of FIGURE 1, showing in detail a side seam of the container.
FIGURE 3 is a partial sectional view along line 3—3 of FIGURE 1, showing in detail the end closure and seam of the container.

In making metallic containers such as cans the operation is highly mechanized and automatic devices are used which serve to form and shape the part and to bring the parts together for formation of seams. These devices are mechanically timed and operate at high rates of speed. Successive parts to be joined follow one another in very short intervals. Moreover automatic can-making machines are equipped with thermostatically controlled heaters which heat the adhesive to a specific and limited temperature range at which the adhesive is soft or liquid.

It is essential in such operation that the bonding agent at this temperature be sufficiently soft and have suitable viscosity characteristics such that it will flow onto the seam portion of the can and such that it will develop adhesive characteristics within a certain limited period of time. It is important that the bonded seams will not fail when the can is subjected to ordinary handling in manufacture, packing and shipping. In addition the products in the cans should not in any way be affected by the metallic container or the adhesive used. In the case of cans for solvents and oils the adhesive must not be soluble in these materials but should retain its adhesive properties under such circumstances.

Referring to the drawing, a container 10 is shown in FIGURE 1 having a body 11 and end closure 12 and side seam 14. FIGURE 2 shows the side seam 14 in detail which is composed of interfolded layers 16 with an adhesive 18 therebetween. A seam by which the end closure 12 is joined to body 11 is shown in FIGURE 3. Again the seam is formed of interfolded layers with the adhesive 18 therebetween.

The containers of the present invention may be made of any metal conventionally used in making containers. Illustrative of the metals which are used are steel, aluminum, copper, bronze, tin plate and the like. As the containers are generally formed of sheet metal, the seams are usually formed of interfolded metal layers. An adhesive is used in the seams to serve to strengthen the mechanical joints formed during can manufacture, thereby yielding a stronger and more rigid container. The adhesive also serves as a sealant to fully contain the ingredients of the container which is impossible of accomplishment by mechanical means alone. Since the two components of the adhesive are fluid the adhesive may have to be applied from a two-component mixing and measuring device which would extrude into place a bead of the mixed cement so that reaction can take place in situ in the seam of the container.

The adhesives used in the present invention for bonding the seams of the sheet metal containers fulfill all the required properties for such an adhesive. The adhesive is nontoxic and possesses the required adhesive and cohesive strength for the application. In addition seams bonded with this material are tough and resilient and remain intact during the usual conditions of handling both in fabrication of the can as well as in packing of the can and in shipment through the ordinary channels of distribution.

As stated previously the adhesive used in the seams of the present containers is the reaction product of amino imidazolines and epoxy resins. The epoxy resins which may be employed are complex polymeric reaction products of polyhydric phenols with polyfunctional halohydrins and/or glycerol dichlorohydrate. The products thus obtained contain terminal epoxy groups. A large number of epoxy resins of this type are disclosed in Greenlee Patents 2,585,115 and 2,589,245. In addition, several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenyl) propane (bisphenol A), the resin having the following theoretical structural formula

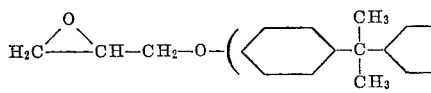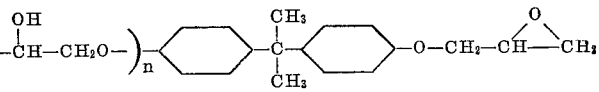

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent weight of pure epoxy resins being the molecular weight of the resin divided by the mean number of epoxy radicals per molecule, or in any case the number of grams of 1 gram-equivalent of epoxide. While certain specific epoxy resins which are the most readily available have been described, it is understood that the epoxy resinous compositions encompassed by this invention are those liquid epoxy resins having an epoxy equivalent weight of 140 to 300, the preferred epoxy equivalent weight being 170 to 220, expressed in terms of grams of compound per epoxy group.

The amino imidazolines which may be employed in this invention may be prepared by reacting polymeric fat acids and polyamines at temperatures within the range of 285 to 315° C. These products are characterized by the fact that they contain a large percentage of imidazoline groups as compared to amide linkages. The products may be defined more specifically by the fact that they contain at least two imidazoline groups for every amide linkage. It will also be appreciated that the imidazoline nucleus

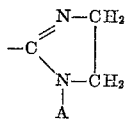

itself contains a reactive hydrogen or alkyl group such as —CH₂CH₂NH₂, at position A.

The polymeric fat acids employed in preparing the new reaction products are those resulting from the polymerization of drying or semidrying oils or their free acids or the simple aliphatic alcohol esters of these acids, particularly sources rich in linoleic acid. Simple drying or semidrying oils include soybean, linseed, tung, perilla, cottonseed, corn, sunflower, safflower, and dehydrated castor. Suitable fatty acids may also be obtained from tall oil, soap stock, and other similar materials. In the polymerization process for the preparation of the polymeric fat acids, the fatty acids with sufficient double bond functionality combine for the most part probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. For example, mono- or polyene fatty acids may be polymerized in the presence of ditertiary-butyl peroxide to yield polymeric fat acids useful in the present invention. The term "polymeric fat acids" as used herein is intended to include any individual polymerized fat acid as well as a polymerized mixture of acids, the latter usually containing a predominant portion of dimer acids, a small quantity of trimer and higher polymeric fat acids and some residual monomer.

While a variety of polymeric fat acids may be used, the most readily available source of such acids is through the polymerization of linoleic acid or linoleic acid rich materials. It should be appreciated that since linoleic acid occurs in nature as a complex mixture in every instance, it is available in various degrees of purity ranging from relatively expensive pure linoleic acid that has been laboriously purified to crude sources such as tall oil and soap stock which contain substances other than fatty acids. In actual practice linoleic acid rich mixtures of fatty acids are used to prepare the polymeric fat acids. One method of obtaining the linoleic acid rich fatty acids is by separating a major portion of the oleic and saturated fatty acids from any convenient and economical source of fatty acids having a high iodine value. In addition, polymeric fat acids are readily available commercial products. One such product is "Empol 1022" as sold by Emery Industries, Inc.

The polyamines useful in forming the amino imidazolines may be illustrated by the general formula H(HNCR₂CR₂)ₙNH₂ where R is hydrogen or a lower alkyl radical containing less than 5 carbon atoms and n is an integer less than 6. Illustrative polyamines are ethylene diamine, diethylene triamine, triethylene tetramine, tetraethylene pentamine, di-1,2-propane triamine and the like.

The ratio of polymeric fat acids and polyamines which may be employed varies from 0.5 to 1.5 mols of polyamine per equivalent of acid. The amino imidazolines are those having relatively high amine numbers. The amine number referred to herein is the number of milligrams of potassium hydroxide equivalent to the amine groups in one gram of product. The amine number thereby indicates the amine groups available for reaction and serves as an indication of the structure and usefulness of the compound. The amine number is therefore one of the chief characteristics of the compounds. In general the amino imidazolines have amine numbers in the range of 270 to 500, a Brookfield viscosity of 100 to 1000 poises, and contain at least two imidazoline groups for every amide group. While the compound is described as an amino imidazoline, it is understood that the compounds employed in this invention also have amide groups as previously discussed, and are not to be limited to compounds having only imidazoline groups. In addition the amino imidazolines employed herein are readily available commercial products.

In determining the suitability of any cement the tear burst values or peel strengths are ordinarily determined. High peel strengths ordinarily indicate desirable characteristics of such cements. By peel strength is meant the force required to separate two sheets bonded together with the adhesive. Although various can companies have various tests for determining the peel strength in which certain particular equipment is used, peel strength as used herein can be defined as the force required to separate two sheets bonded together by separating the bonded sheets by pulling them over ½" diameter roll guides at the speed of one inch per minute. The roll guides are supported in a jig which can be used in any conventional tester such as a Dillon tester. One end of the jig is attached to one end of the tester, the other end of the tester being attached to the ends of the two bonded sheets which lie over opposite roller guides.

Example I

An amino imidazoline having an amine number of about 375 and viscosity of about 150 poises at 25° C. which was prepared from polymeric fat acids and triethylene tetramine was modified with various percentages of an epoxy resin derived from bisphenol A and epichlorohydrin having an epoxy equivalent weight of about 200. The peel strength or tear burst was measured on samples of ¾ inch tin plate (can maker's quality) bonded with the epoxy-imidazoline composition by the method described above in a Dillon tester. The results can be seen from the following table:

| Amino-imidazoline, parts by weight | Epoxy resin, parts by weight | Peel strength in lbs. per .75 inch |
|---|---|---|
| 70 | 30 | 68 |
| 65 | 35 | 73 |
| 60 | 40 | 37 |

By comparison the peel strength of a 30% tin–70% lead solder is 55 lbs. per .75 inch. When tin plate cans or other metallic containers are made in the conventional manner using the imidazoline-epoxy cement in the seams the cans are rigid and the seams will not fail under ordinary handling in manufacturing, packing and shipping.

It is apparent from the foregoing example that containers having seams bonded with the amino imidazoline-epoxy composition previously described provide seams having high peel strength. With such seams containers will not fail under the handling encountered in manufacturing testing, packing and shipping.

Having thus described my invention, I therefore claim:

1. A metallic container having seams, said seams being bonded by a cured resinous composition, said composition comprising an epoxy resin of bisphenol A and epichlorohydrin having an epoxy equivalent weight of 140 to 300 and an amino imidazoline of polymeric fat acids and an excess of a polyamine having the formula H(HNCR₂CR₂)ₙNH where R is selected from the group consisting of hydrogen and alkyl radicals having from 1 to 4 carbon atoms and n is an integer of from 1 to 5, said amino imidazoline having an amine number of from 270 to 500.

2. A metallic container as defined in claim 1 in which said epoxy resin has an epoxy equivalent weight of from 170 to 220.

3. A metallic container as defined in claim 1 in which said amino imidazoline has an amine number of 350 to 400.

4. A metallic container as defined in claim 1 in which said amino imidazoline has a viscosity of 100 to 300 poises at 25° C.

References Cited in the file of this patent

UNITED STATES PATENTS

| | | |
|---|---|---|
| 2,119,280 | Kronquest et al. | May 31, 1938 |
| 2,840,264 | Groves | June 24, 1958 |
| 2,878,233 | Harrison | Mar. 17, 1959 |

FOREIGN PATENTS

| | | |
|---|---|---|
| 1,181,817 | France | Jan. 12, 1959 |